United States Patent [19]

Hoyt

[11] 4,001,440
[45] Jan. 4, 1977

[54] FREEZABLE CONFECTION PACKAGE

[75] Inventor: Earl Hoyt, Ramsey, N.J.

[73] Assignee: Welch Foods Inc., Westfield, N.Y.

[22] Filed: July 24, 1974

[21] Appl. No.: 491,528

[52] U.S. Cl. .............................. 426/104; 426/87; 426/110; 426/393; 426/515

[51] Int. Cl.² ......................................... A23G 1/00

[58] Field of Search .......... 426/104, 106, 110, 124, 426/130, 134, 91, 87, 383, 393, 515; 249/55, 95, 115; 206/461, 471, 493

[56] References Cited

UNITED STATES PATENTS

| | | | |
|---|---|---|---|
| 2,728,677 | 12/1955 | Colman | 426/110 |
| 2,759,831 | 8/1956 | Young et al. | 426/110 |
| 2,843,493 | 7/1958 | Sharples | 426/515 X |
| 3,288,280 | 11/1966 | Bostrom | 206/461 |
| 3,312,555 | 4/1967 | Rossi et al. | 426/134 |
| 3,618,751 | 11/1971 | Rich | 426/134 X |
| 3,662,693 | 5/1972 | Dana | 426/515 |
| 3,748,778 | 7/1973 | Ellies et al. | 426/134 X |
| 3,867,927 | 2/1975 | Hergott | 426/134 X |

FOREIGN PATENTS OR APPLICATIONS

| | | | |
|---|---|---|---|
| 77,473 | 4/1954 | Denmark | 426/134 |
| 835,066 | 5/1960 | United Kingdom | 426/124 |

*Primary Examiner*—Robert Halper
*Attorney, Agent, or Firm*—Dayton R. Stemple, Jr.

[57] ABSTRACT

A package for use in forming a stick-mounted frozen confection comprising a sealed chamber receiving the freezable confection liquid material, a stick handle projecting outwardly from the chamber and a wrapper defining the chamber and enclosing and properly orientating the handle relative to the confection material. The wrapper includes overlying sheets, one of which is formed to define the chamber in conjunction with a character or other simulation which will be three-dimensionally reproduced on the frozen confection. The stick handle, outward of the chamber, is offset and can be configured to complement the reproduced simulation or can incorporate indicia thereon. In addition, a rigidifying rib can be provided to strengthen the handle at the offset portion thereof. The sheets are sealed peripherally thereabout to define a rigidifying flange, a sealed chamber and a stick enclosure in conjunction with stick rigidifying webs or gussets between the projecting portion of the stick and the chamber forming portion of the wrapper. The chamber forming sheet includes an elongated recess for receiving the handle, which recess may incorporate a projecting positioning peg for reception through an aligning hole in the handle.

11 Claims, 13 Drawing Figures

FREEZABLE CONFECTION PACKAGE

The invention herein generally relates to confection packages, and is more particularly concerned with packages for frozen confections wherein the confection material is packaged and sold in liquid form for freezing at a later date by the consumer in a home freezer or the like.

The liquid confection material can be of any appropriate type resistant to decomposition, deterioration or spoilage at room temperature and capable of freezing to a solid self-sustaining shape in a conventional home freezer. The wrapper and stick handle will be formed of suitable material which is liquid impervious and not subject to deterioration or contamination. Examples of related packages will be noted in U.S. Pat. Nos. 2,728,677 and 2,759,831 wherein the advantages and basic requirements of such packages are detailed.

The package of the present invention constitutes a significant improvement over known packages by making possible a mass producible product which combines increased structural integrity, an attractive and interest stimulating three-dimensional appearance, and a compact and easily packaged and stored configuration.

The package wrapper encloses both the freezable confection material within a sealed chamber and the stick handle which projects outwardly from the chamber. In enclosing the projecting portion of the handle, the wrapper defines a pair of integral rigidifying webs which diverge outwardly from the enclosed free end of the handle rearwardly to the relatively wider chamber with the chamber itself being encircled by a planar outwardly projecting sealing and rigidifying web.

The package will normally be made utilizing a planar back sheet and a front sheet formed to define an enlarged confection material accommodating and molding chamber having a character or other simulation formed in the outer face thereof for reproduction on the frozen confection product. The projections on the simulation generally terminate in a common plane so as to provide a flat stacking face in conjunction with the planar bottom or back sheet. The stick handle, centrally located within the chamber received confection material and incorporating apertures therethrough for enhanced bonding to the confection material upon a freezing thereof, has the outwardly projecting portion thereof offset so as to overlie the back sheet in direct engagement therewith for a sealing thereto by the front sheet in a manner so as to exclude the liquid confection material therefrom.

Actual positioning of the handle is effected by the provision of a recess within the front sheet projecting outwardly from the formed chamber. This recess snugly receives the projecting portion of the handle for a retention of the handle until such time as the confection material is frozen. Further stabilization of the handle can be effected by the provision of an integral peg projecting upwardly from the base of the handle receiving slot and receivable snugly within an aperture provided in the end portion of the handle.

The handle itself can be three-dimensionally configured so as to provide a simulation which complements that formed by the chamber, for example providing a simulated body for an enlarged confection material head. Alternatively, appropriate informative material can be molded, printed, or otherwise provided on the exposed portion of the handle.

These together with additional objects and advantages reside in the details of construction as more fully hereinafter described and claimed. Reference is now had to the accompanying drawings forming a part hereof in which:

Figure 1:
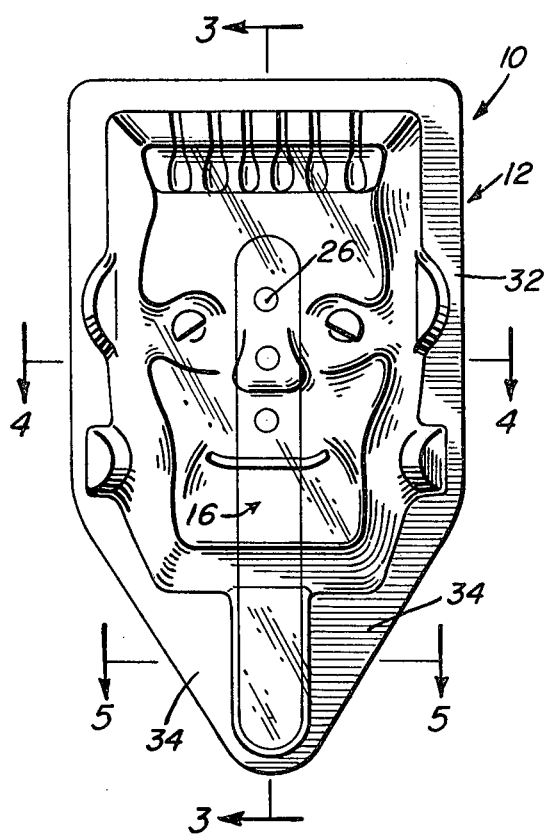
FIG. 1 is a front view of the confection package of the present invention.

Referring now more specifically to the drawings, reference numeral 10 is used to generally designate the basic package comprising the invention. The package 10 includes a wrapper 12, a freezable liquid confection material 14 and a stick handle 16.

The wrapper 12, normally formed of an appropriate shape sustaining thermal plastic material, includes a planar back sheet 18 and a front sheet 20 peripherally coextensive with the back sheet 18. The front sheet 20 includes an enlarged confection accommodating and molding pocket formed therein, for example by a conventional thermoforming process, which combines with the back sheet 18 to define a chamber referred to by reference numeral 22. In addition, a handle receiving slot or recess 23 is formed in the front sheet 20 outward of chamber 22 for a snap fitting of the projecting portion of the handle therein.

The stick or handle 16 includes a first elongated portion 24 received centrally within the confection receiving chamber 22 between the front and back sheets. This portion 24 of the handle 16 includes apertures 26 therein to allow for a more intimate bonding of the handle to the confection material upon a freezing thereof. The handle 16 includes a relatively sharp angular bend on offset 28 therein immediately inward of one side wall of the chamber with the portion 30 of the handle outward of the bend at 28 directly overlying the back sheet 18 and being snugly received in recess 23. The handle portion 30 of course extends a sufficient distance outward of the chamber 22 so as to allow for an easy grasping thereof when the frozen product is being consumed.

The back sheet 18 is sealed to the front sheet 20, preferably by appropriate heat sealing means assuming the use of thermoplastic material, and combines therewith to define a rigid outwardly projecting web or flange 32 in approximately the plane of the back sheet 18. This sealing of the chamber 22 extends across the projecting portion 30 of the handle 16 so as to completely seal the chamber along the edge thereof through which the handle centrally projects. The entire length of the projecting portion 30 of the handle 16 is sealed between the planar back sheet 18 and the overlying front sheet 20 with the rigidifying flange-like web 32 continuing down and around the free lower end of 32 the outwardly projecting portion 30. In so extending the web 32, a pair of package rigidifying triangular side gussets or web panels 34 are provided to the opposite sides of the projecting portion 30 of the stick handle 16. These rigidifying web sections 34 diverge from the free outer end of the stick portion 30 to the opposed outer ends of the chamber side through which the stick projects and into an integral continuation of the chamber encircling portion of the web 32. The provision of the projecting portion 30 of the handle 16 in the recess 23 and in direct engagement with the back sheet 18 in conjunction with the rigidifying gussets 34 insure that no damaging movement of the handle 16 relative to the chamber 22 or liquid confection material 14 will occur. In this manner, any accidental rupturing of the package at the particularly vulnerable entrance of the handle into the chamber, and the resultant mess that would result therefrom prior to a freezing of the confection material, is substantially precluded. Further, as the handle portion 30 is immobilized within the slot or recess 23 and against the planar back sheet 18, no misalignment of the handle 16 will occur during the handling, stacking or storage thereof such as could affect the appearance of the final product.

Figure 2:
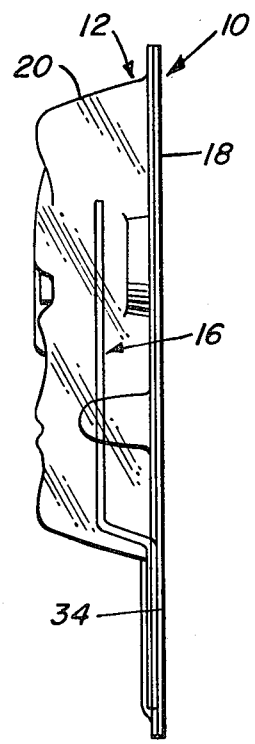
FIG. 2 is a side elevational view of the package.
Figure 3:
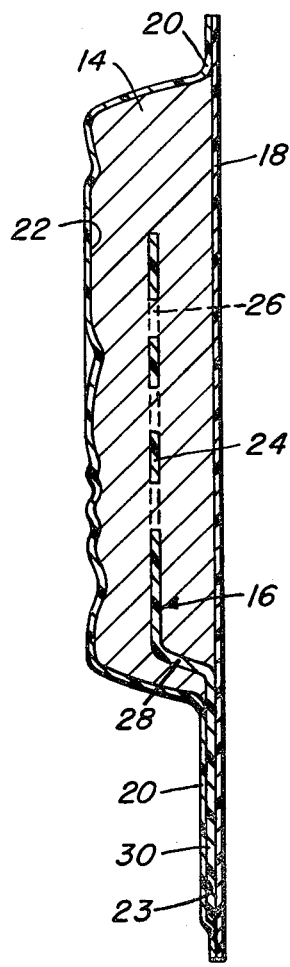
FIG. 3 is an enlarged longitudinal cross-sectional view taken substantially on a plane passing along line 3—3 in FIG. 1.
Figure 4:
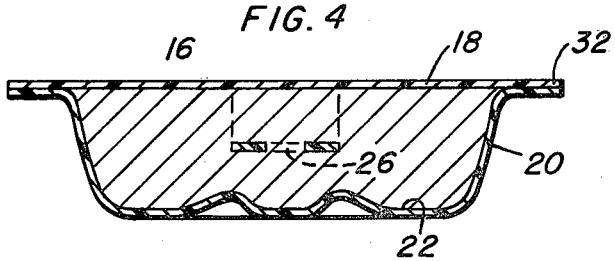
FIG. 4 is an enlarged transverse cross-sectional view taken substantially on a plane passing alone line 4—4 of FIG. 1.
Figure 5:
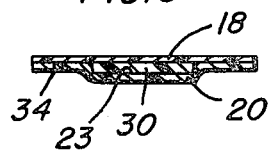
FIG. 5 is a transverse cross-sectional view taken substantially on a plane passing along line 5—5 in FIG. 1.

As will be appreciated from the drawings, the front wall and sides of the chamber 22, defined by the formed portion of the front panel 20, are configured so as to present an interesting three-dimensional design or the like, normally simulating a well known character. With reference to the views of FIGS. 2, 3, and 4, attention is directed to the fact that all of the feature forming projections terminate at, or in some instance slightly below, a common plane so as to define a flat support surface which, in conjunction with the flat back sheet, greatly simplifies the packing, shipping and storage of the package 10.

The chamber 22, formed in this manner, constitutes a mold for the freezable confection material, enabling the reproduction of the design in the frozen confection itself.

By providing for an actual forming of the design or simulation within the package and molding chamber defined therein, such requiring the utilization of a shape-sustaining wrapper, the product can be mass produced. This could in all probability not be attained were the confection to be pre-frozen in separate molding equipment due to the difficulty which would arise in attempting to extract the frozen confection because of the various protuberances and recesses utilized in the formation of the design or character simulation.

Various other related aspects of the basic package of the invention have been detailed in FIGS. 6–13. In regard thereto, attention is initially directed to FIGS. 6, 7, and 8.

In order to facilitate an opening of the package, the front sheet 20, in those portions thereof which define the side gussets or panels 34, are provided with semicircular cut-outs 36 so as to expose the underlying back panel 18. In this manner, the ultimate user can, by inserting one or more fingers in the cut-outs 36, strip the back panel 18 from the front panel 20 and expose the frozen confection for removal from the package. In conjunction therewith, it should be appreciated that if the back panel is carefully removed, the mold-like configuration of the front sheet 20 can be retained and utilized as a toy for sand or clay molding, or the like.

Figure 6:
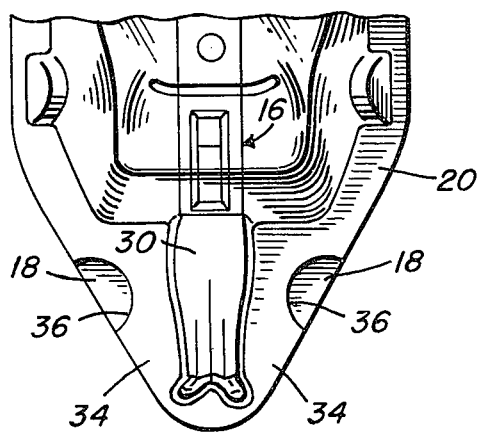
FIG. 6 is a front view of the lower portion of the confection package wherein the projecting portion of the stick handle is provided with a three-dimensional simulation and the wrapper includes starting cut-outs.
Figure 7:
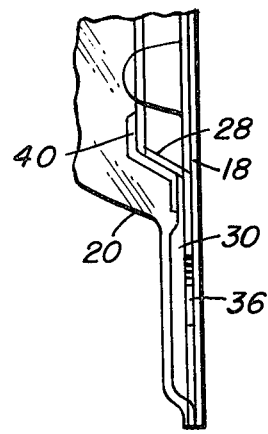
FIG. 7 is a side elevational view of the structure of FIG. 6.
Figure 8:
FIG. 8 is a perspective view of a frozen confection with the handle of FIG. 6, and the wrapper removed.

As will also be noted in consideration of FIGS. 6, 7, and 8, the stick handle, also herein designated by reference numeral 16, has the outer projecting portion 30 thereof three-dimensionally configured so as to provide a shape which will complement that of the chamber molded frozen confection. More specifically, assuming the frozen confection is in the nature of an enlarged head, the projecting handle portion 30 can, in three-dimension, simulate a body, legs and projecting feet, as illustrated. Other configurations or simulations can of course be provided as deemed appropriate with the stick 16 retaining the necessary integrity to support the confection. It will of course be appreciated that the stick receiving slot 23 of the front sheet 20 will have to be appropriately formed so as to accommodate the three-dimensionally configured stick portion 30. However, this should in no way affect the basic packaging and molding concepts involved.

Figure 11:
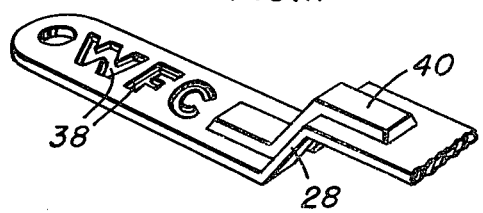
FIG. 11 is a perspective view of the offset and the projecting portion of the handle illustrating the reinforcing rib and indicia.
Figure 12:
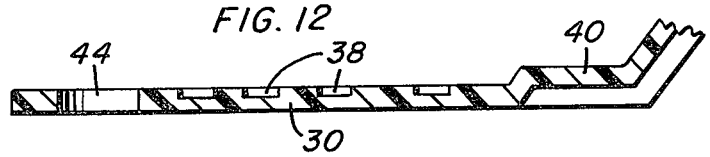
FIG. 12 is an enlarged cross-sectional longitudinal view through the handle portion of FIG. 11.

As an alternative to the provision of a three-dimensional figure on the stick portion 30, various purchase incentive indicia can be provided thereon either by printing or by relief molding directly in the plastic material of the handle portion 30 as suggested at reference numeral 38 in FIGS. 11 and 12. Such indicia can include point values, riddles, special offers, or the like.

Assuming the use of a plastic stick, as will in most instances be the case, it may be desirable to reinforce the angular bend or offset 28. It is contemplated that this be effected by the provision of a molded rib 40 recessed through one face of the stick 16 and projecting out of the plane of the other face of the stick. This rib 40 will extend centrally through and slightly beyond the bend 28 and provide for a substantial structural strengthening of the stick in this inherently weak area which may, due to the particular nature of the plastic handle, be further weakened when the stick is frozen. The actual necessity of the use of such a rib 40 will of course depend on several factors including the nature of the stick material, the degree of bend, and the weight, configuration and/or size of the confection configuration. As will be appreciated, the bend 28 is itself significant in insuring a proper central location of the inner portion 24 of the handle within the confection material and a protected orientation of the outer portion 30 of the handle directly against the back sheet 18.

Figure 13:
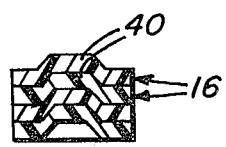
FIG. 13 is a cross-sectional detail illustrating a stack of sticks interlocked through the molded rib construction for packaging purposes.

With reference to FIG. 13, it will be appreciated that the side walls of the rib 40 are tapered so as to enable a stacking of the sticks 16 with the ribs providing an interlock therebetween, thus facilitating a storing and packaging of the sticks themselves.

Figure 10:
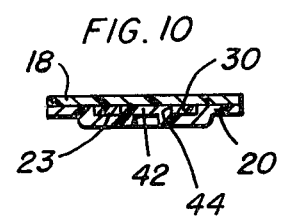
FIG. 10 is a cross-sectional detail through the mounted peg secured stick handle.
Figure 9:
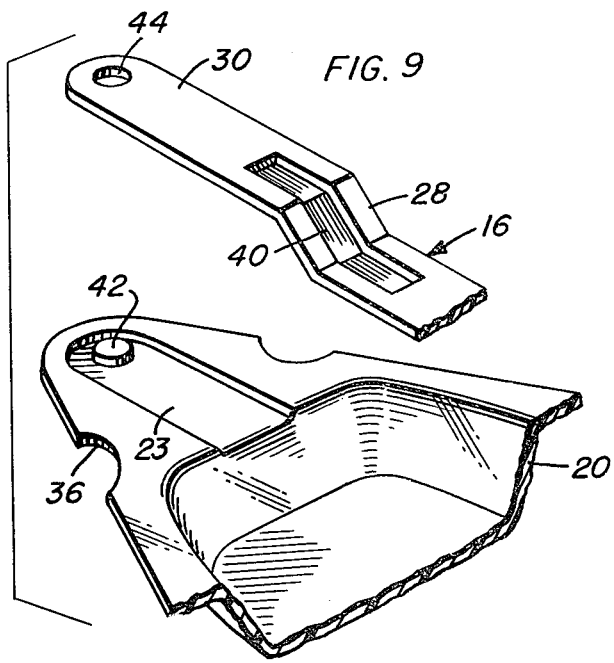
FIG. 9 is an exploded perspective view illustrating the positioning peg and cooperating stick aperture, as well as the molded reinforcing rib.

A further significant feature of the invention is illustrated in FIGS. 9 and 10. This feature involves the provision of means for further stabilizing the stick handle 16 in the package, or more particularly relative to the front sheet 20 both prior to the introduction of the unfrozen confection material and subsequent thereto during the actual completion of the package and until such time as the confection material is frozen and the stick positively locked therein. More specifically, the slot or recess 23 within which the projecting portion 30 of the stick handle 16 is snap or frictionally received is provided with an integral upwardly or outwardly projecting peg 42 adjacent the outer end thereof. This peg 42 is frictionally received through a similarly shaped aperture 44 provided in the corresponding outer end section of the handle portion 30 whereby a positive locking of the handle in the recess 23 is effected. The relationship between the pegs 42, handle aperture 44 and covering sheets 18 and 20 is best illustrated in the sectional detail of FIG. 10.

From the foregoing, it will be appreciated that a unique package for freezable confections has been designed. This package constitutes a significant advance in the technology in several areas including structural integrity, storage or stacking convenience, and appearance.

Of significance with regard to structural stability is the provision of the encircling web 32 and diverging side webs or gussets 34 which, without any appreciable enlarging of the overall package, provide for a positive rigidification of the package and in particular of the stick handle relative to the main confection accommodating and molding chamber. It will of course be appreciated that the back and front sheets, even upon a forming of the front sheet into the desired configuration, possess sufficient rigidity so as to be self-sustaining.

Additional structural stability or integrity can be achieved by the integral incorporation of a reinforcing rib along and slightly beyond the bend in the stick handle. This rib will in no way affect the appearance of the ultimately achieved frozen confection and will in fact tend to increase the bond between the frozen confection material and the stick handle.

Likewise, in the package, when assembled and prior to an actual freezing of the confection material, a proper orientation and stabilization of the stick handle 16 can be enhanced by the utilization of a positioning and locking peg which cooperates with an aperture defined through the handle.

The appearance of the completed package, as well as the frozen confection ultimately obtained therefrom, is highly distinctive and can in itself provide a sort of product identification eliminating the need of package labeling or the like. The design of character simulation, in addition to incorporation thereof in the frozen confection material itself, can be enhanced by an appropriate three-dimensional configuring of the projecting portion of the stick handle rather than the provision of a conventional two-dimensional configuration.

The foregoing is considered illustrative of the principles of the invention. Since modifications and changes may occur to those skilled in the art, it is not desired to limit the invention to the exact construction shown and described, and accordingly all suitable modifications and equivalents may be resorted to, falling within the scope of the invention as claimed.

What is claimed is:

1. A freezable confection package comprising a wrapper, said wrapper including a planar back sheet and a front sheet formed to define a confection accommodating and molding chamber with the planar back sheet, an elongated handle substantially narrower than said chamber projecting outward from the interior of, at a point central to one edge of, said chamber and terminating in a free outer end, said handle, within the chamber, paralleling the planar back sheet in spaced relation thereto centrally within the chamber, and outward of the chamber, being offset relative to the portion in the chamber and being received between said front and back sheet in overlying contact with said back sheet, said sheets being sealed to each other about the chamber and outward projecting portion of the handle to define a closed chamber, said sheets forming a rigidifying web on each side of said handle diverging from the outer end of the handle to the full width of said chamber edge to form generally triangular rigididying gussets, said sheets additionally forming an outwardly projecting planar second rigidifying web about the remaining edges of said chamber integral with said rigidifying gussets, and a room temperature, liquid confection enclosed within said chamber, said liquid being freezable to solid state in a home freezer, said formed front sheet being configured to define a design simulation over the chamber which is reproduced on said confection enclosed therein.

2. The package of claim 1 wherein said simulation includes multiple projections terminating in a common plane.

3. A freezable confection package comprising a wrapper, said wrapper including a planar back sheet and a front sheet formed to define a confection accommodating and molding chamber with the planar back sheet, an elongated handle substantially narrower than said chamber projecting outward from the interior of, at a point central to one edge of, said chamber and terminating in a free outer end, said handle, within the chamber, paralleling the planar back sheet in spaced relation thereto centrally within the chamber, and outward of the chamber, being offset relative to the portion in the chamber and being received between said front and back sheets in overlying contact with said back sheet, said sheets being sealed to each other about the chamber and outward projecting portion of the handle to define a closed chamber, said sheets forming a rigidifying web on each side of said handle diverging from the outer end of the handle to the full width of said chamber edge to form generally triangular rigidifying gussets, said sheets additionally forming an outwardly projecting planar second rigidifying web about the remaining edges of said chamber integral with said rigidifying gussets, and a room temperature liquid confection enclosed within said chamber, said liquid being freezable to solid state in a home freezer, said handle portion within the chamber including aperture means therein for an intimate bonding of a chamber received confection thereto.

4. A freezable confection package comprising a wrapper, said wrapper including a planar back sheet and a front sheet formed to define a confection accommodating and molding chamber with the planar back sheet, an elongated handle including a first portion within the chamber which parallels the planar back sheet in spaced relation thereto centrally within the chamber, and a second portion outward of the chamber being offset relative to the chamber received portion and being in overlying contact with the back sheet and a bend in said handle between the first and second portions which includes a centrally located integrally formed reinforcing rib, said rib projecting slightly beyond the bend and into said first and second portions, said sheets being sealed to each other about the chamber and outward projecting portion of the handle to define a closed chamber, said sheets forming a rigidifying web between the second portion of the handle and the chamber, and a room-temperature, liquid confection enclosed within said chamber, said liquid being freezable to solid state in a home freezer.

5. A freezable confection package comprising a wrapper, said wrapper including a planar back sheet and a front sheet formed to define a confection accommodating and molding chamber with the planar back sheet, an elongated handle projecting outward from the interior of the chamber and terminating in a free outer end, said handle, outward of the chamber, being received between said front and back sheets, said sheets being sealed to each other about the chamber and outward projecting portion of the handle to define a closed chamber, said sheets forming a rigidifying web between the outer end of the handle and the chamber to the opposite sides of the handle, and a room-temperature, liquid confection enclosed within said chamber, said liquid being freezable to solid state in a home freezer, said formed front sheet being configured to define a design simulation over the chamber which is reproduced on said confection enclosed therein.

6. The package of claim 5 wherein said simulation includes multiple projections thereon terminating in a common plane.

7. The package of claim 5 wherein the outwardly projecting portion of the elongated handle is three-dimensionally configured to define a design simulation complementing that which is to be reproduced on the confection product.

8. A freezable confection package comprising a wrapper, said wrapper including a back sheet and a front sheet formed to define a confection accommodating molding chamber with the back sheet, an elongated handle having a first portion within said chamber and a second portion projecting exteriorly from said chamber, said front sheet including an elongated chamber-communicated relatively narrower recess defined therein and receiving the projecting portion of the handle, said recess including an inwardly projecting peg, the projecting portion of the handle including an aperture which receives the peg therethrough for retention of the handle, said sheets being sealed to each other about the chamber and recess to enclose the chamber and recess and form a rigidifying flange thereabout, and a room-temperature, liquid confection enclosed within said chamber, said liquid being freezable to solid state in a home freezer.

9. The package of claim 8 wherein said peg is of a height substantially equal to the depth of the recess and is frictionally locked within the aperture.

10. A freezable confection package comprising a wrapper, a confection product retaining chamber defined within a first section of the wrapper, an elongated handle having a first portion within said chamber and a second portion projecting exteriorly from said chamber, and a room-temperature, liquid confection enclosed within said chamber, said liquid being freezable to solid state in a home freezer, said chamber being configured to define a design simulation (for reproduction) on (a) said confection product within the chamber when frozen, said projecting second portion of the handle having a three-dimensional design simulation complementing that of the chamber, said wrapper being peripherally sealed about the chamber and enclosing the elongated handle.

11. The package of claim 10 wherein the design simulation of the chamber includes multiple projections and represents a recognizable character.

* * * * *